May 7, 1940.  G. L. LARISON  2,199,409
COMPENSATING WHEEL MOUNTING FOR VEHICLES
Filed Aug. 5, 1938    4 Sheets-Sheet 1

Inventor
Glenn L. Larison
By T. J. Geisler
and H. H. Geisler
Attorneys

May 7, 1940.  G. L. LARISON  2,199,409
COMPENSATING WHEEL MOUNTING FOR VEHICLES
Filed Aug. 5, 1938  4 Sheets-Sheet 2

Inventor
Glenn L. Larison
By T. J. Geisler and
F. K. Geisler.
Attorneys

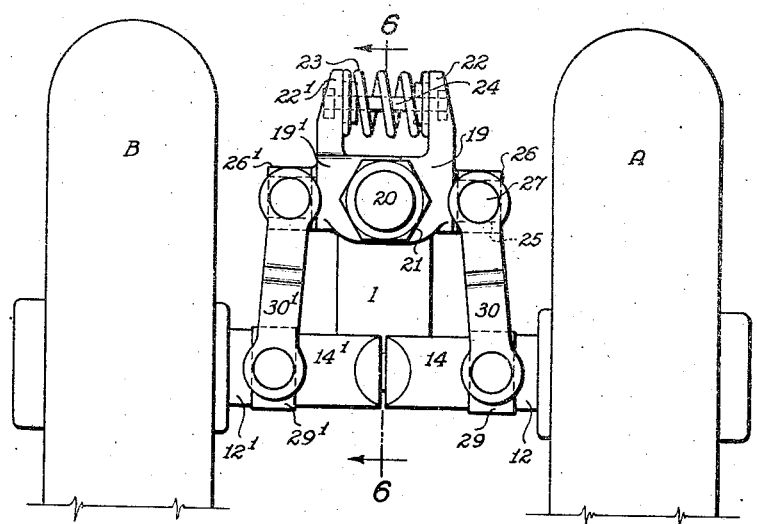
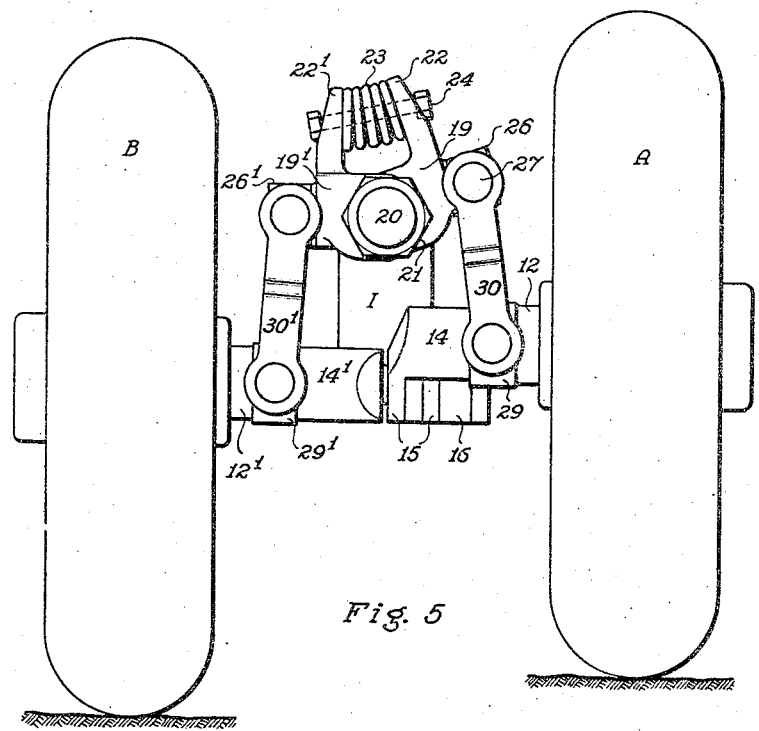

May 7, 1940.                G. L. LARISON                2,199,409
              COMPENSATING WHEEL MOUNTING FOR VEHICLES
                    Filed Aug. 5, 1938          4 Sheets-Sheet 4

Inventor
Glenn L. Larison
By T. J. Geisler
and F. K. Geisler
Attorneys

Patented May 7, 1940

2,199,409

UNITED STATES PATENT OFFICE 2,199,409

COMPENSATING WHEEL MOUNTING FOR VEHICLES

Glenn L. Larison, La Grande, Oreg.

Application August 5, 1938, Serial No. 223,275

8 Claims. (Cl. 280—81)

My invention relates to vehicles of various types, but, more particularly, to trucks and trailers of the heavy duty type in which multiple wheels are necessary for properly carrying the load.

In vehicles of this character it is customary to provide a plurality of wheels in pairs in order to obtain greater load-carrying efficiency. In my invention I also use wheels in pairs but mount each wheel separately and permit each wheel separately to be raised above the other wheels.

An object of my invention is to mount the vehicle wheels, arranged in pairs, in such manner that each and every wheel will carrying its share of the load at all times regardless of the irregularities in the surface of the roadway.

A further object of my invention is to furnish a compensating device thru the medium of the mounting of the wheels in each pair, whereby relative movement will be permitted of the wheels in each pair in such manner as to compensate, to a considerable extent, for such irregularities in the road surface, and thereby minimize the raising, lowering or tilting of the vehicle frame or body which would normally occur due to bumps, depressions or other irregularities in the road surface; and also minimize the jars and shocks when the vehicle is passing over such rough surfaces.

Various means for permitting compensation in the mounting of vehicle wheels arranged in pairs have been tried out with more or less success, but such devices generally require the tilting of the spindles of the wheels from the horizontal in order to permit one wheel to be raised higher than the other and thus to function in the manner of a compensating device. But the tilting of the wheel spindles from the horizontal necessitates a lateral slipping of the wheels on the road surface, that is to say, as the wheels are raised or lowered they are shoved slightly laterally on the road surface. This lateral movement back and forth, which will occur constantly while the wheels are rolling over rough surfaces, has been found to result in considerable extra wear on the tires.

A special object of my invention, accordingly, is to provide a compensating mounting for each pair of wheels in which such tilting of the wheels or wheel spindles does not occur, and in which the wheels will rotate in parallel vertical planes with the space between the planes of the wheels remaining constant, and thus eliminating the objectionable side slippage of the wheels on the road.

Another object of my invention is to provide resilient or spring means connecting the supports for the wheel mountings in each pair as a further means of minimizing the jars and shocks, particularly when both wheels of a pair are required to pass over a bump simultaneously, and further, to make it possible to dispense with the usual leaf springs or other spring mountings for the vehicle.

A still further object of my invention is to provide means for limiting the downward and upward movement of each wheel mounting or wheel spindle with respect to the companion wheel spindle in each pair, whereby, in the event of the entire failure of one wheel, the other wheel of the pair will function to sustain the load previously carried by both wheels and thus permit temporary further travel of the vehicle under such condition.

The above mentioned and incidental objects I attain by providing wheel spindle assemblies in pairs, with each spindle assembly separately hinged to a frame member, such as a longitudinal beam, or walking beam, in such way that each wheel assembly may oscillate vertically without lateral displacement; and further by connecting each pair of wheel assemblies in such manner that an upward movement or upward thrust of one wheel assembly will cause a force in the opposite direction to be exerted on the other assembly; and by providing suitable stops limiting such oscillation; and, finally, by providing suitable cushioning means.

These features will be apparent from the following description with reference to the attached drawings illustrating practical embodiments of my invention.

In the drawings:

Figs. 4 and 5 are end elevations of the same pair of wheels and wheel spindle assemblies, Fig. 4 showing the wheels at the same height and Fig. 5 illustrating the action which takes place when one of the wheels is suddenly raised above the other as occurs when one wheel is forced to pass over a bump on the road surface;

Figure 1:
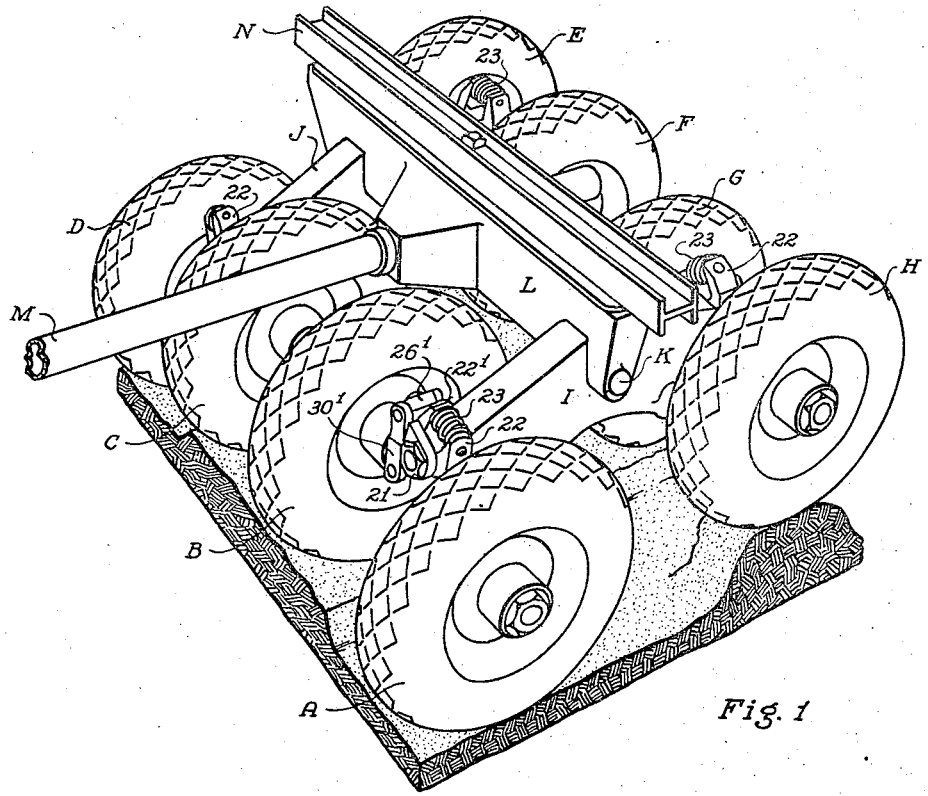
Fig. 1 is a perspective view of a heavy-duty trailer supported on eight wheels and embodying the principles of my invention, the wheels being shown raised to different heights as might occur when the vehicle is traversing an extremely uneven road surface.

In the heavy-duty vehicle shown in Fig. 1, the eight rubber-tired wheels A, B, C, D, E, F, G and H are arranged in two transverse rows of four each. Each wheel is permitted independent vertical movement in accordance with the principles of my invention and the vehicle load is at all times evenly distributed among the eight wheels. The wheels A and B are mounted on spindle carrying assemblies independently hinged to the forward end of a longitudinal member I, the wheels G and H are mounted in like manner at the rear end of the longitudinal member I. Similarly, the wheels C and D and the wheels E and F are mounted at the forward and rear ends, respectively, of the companion longitudinal member J. The longitudinal members or "walking beams" I and J are pivotally connected, as shown at K, to the transverse bolster L which, in this particular trailer type of vehicle, constitutes the main chassis member and is provided with the usual draw bar M and superimposed bunk N. The pivotal connections of the longitudinal members I and J to the bolster L permit these members to oscillate in vertical planes parallel to the direction of travel of the vehicle when the wheels traverse uneven road surfaces.

As previously indicated, the wheel-carrying assemblies in my invention are arranged in pairs. Thus, four pairs of these assemblies are required for the eight-wheeled trailer of Fig. 1, but since these four pairs are identical, only one pair need be described. For this purpose the assemblies for the wheels A and B will be described in detail with reference to Figs. 3, 4, 5, 6 and 7.

The wheels A and B are rotatably mounted on the spindles 11 and 11', respectively, in abutment with the fixed collars 12 and 12'. The spindle 11 is formed integral with, or rigidly secured to, an arm 14, and the spindle 11' is likewise formed on, or secured to, a similar arm 14', the spindles extending from opposite sides of and perpendicularly to the vertical plane of the longitudinal member I, substantially as shown in the sectional plan Fig. 7. The inner ends of the arms 14 and 14' are bifurcated to form hinge portions 15 and 15' which register with similar bifurcations of a hinge fixture 16, integral with the longitudinal member I, in such manner that the hinged arms 14 and 14' may swing independently in vertical arcs about the common hinge pin 17, the hinge pin 17 being perpendicular to the vertical plane of the longitudinal member I. The hinge fixture 16 is set in a suitable recess at the bottom of the walking beam I to permit limited upward movement of the spindle-arms 14 and 14' as shown in longitudinal section in Fig. 6. The limit of such upward pivotal movement of the spindle-arms 14 and 14' may be definitely established by the provision of a stop plate 18 of the required thickness firmly attached to the walking beam I. These hinged spindle-arms with their hinge connection to the longitudinal beam I, permitting up and down movement of the wheel-spindles without any side or lateral movement with respect to the beam I, constitute the most important part of my invention, and allow independent movement of the vehicle wheels in planes always parallel to the substantially vertical plane of the walking beam or longitudinal chassis member.

A stub shaft 20, (Fig. 6), is firmly secured in the end of the beam I near the top, with its axis substantially horizontal and in alignment with the longitudinal center line of the beam I. On this shaft 20 are rotatably mounted the rocker arms 19 and 19' for free and independent rotation and are held against axial displacement thereon by the nut 21.

Figure 3:
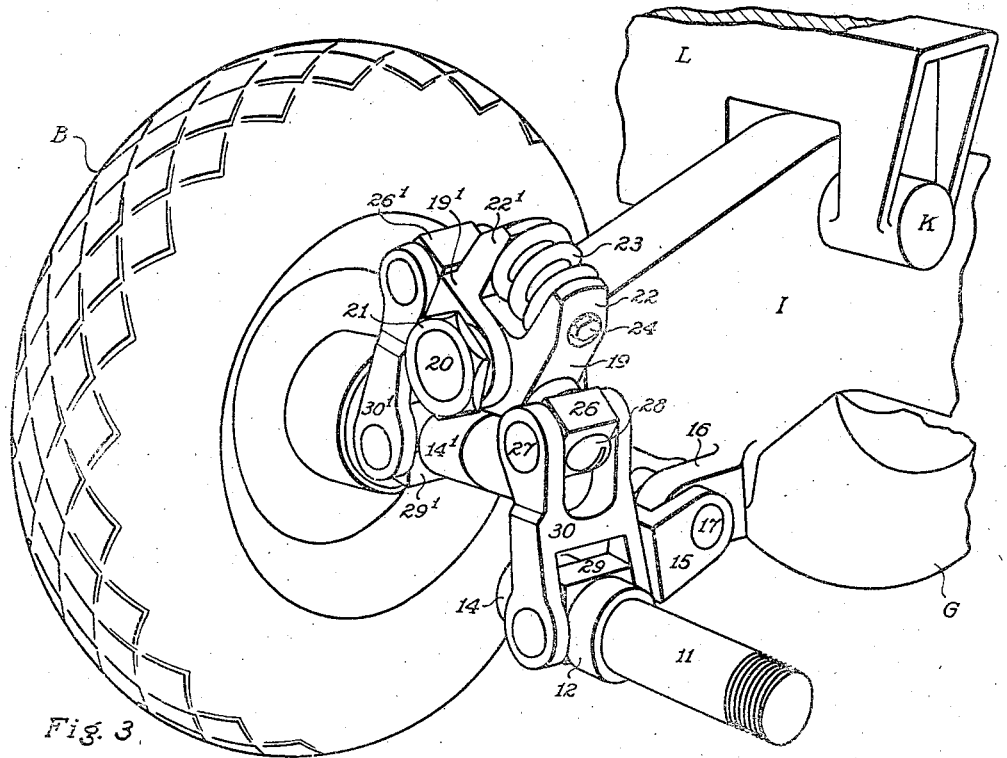
Fig. 3 is an enlarged perspective view of the mountings of one pair of wheels of the vehicle illustrated in Fig. 1, one of the wheels of this pair having been removed to show the construction and action of the wheel spindle assemblies more clearly.
Figures 6, 7:
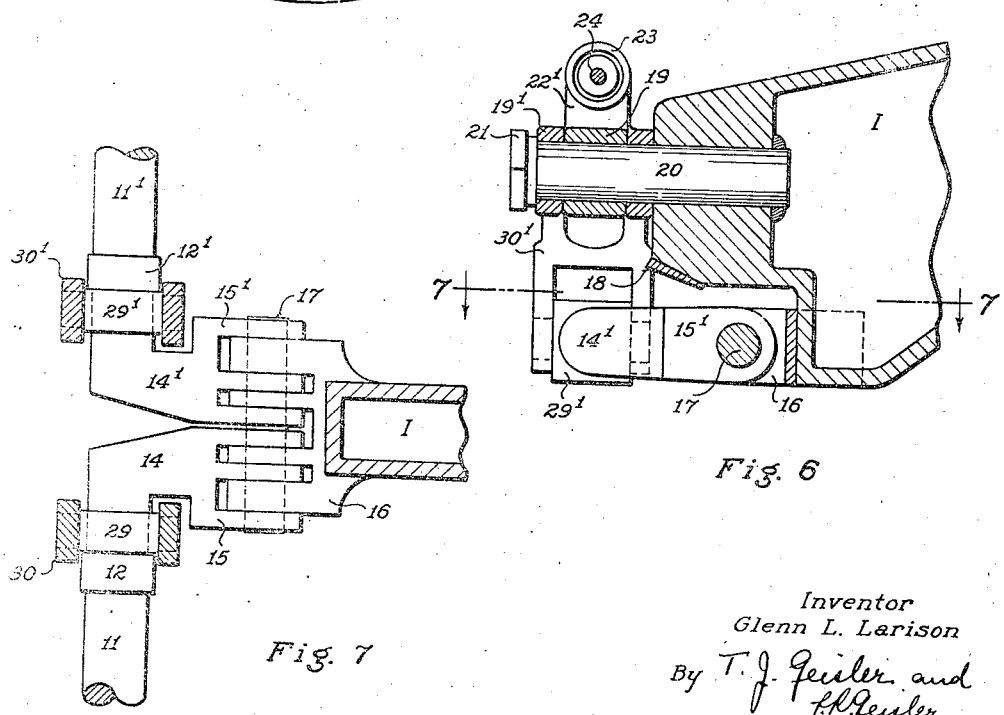
Fig. 6 is a fragmentary medial sectional elevation corresponding to the line 6—6 of Fig. 4.
Fig. 7 is a sectional plan taken on line 7—7 of Fig. 6.

The hub of the rocker 19 occupies the central portion of the extending part of the shaft and the hub of the rocker 19' is bifurcated to fit on each side of the hub of the rocker 19 as seen in Figs. 3 and 6. An upstanding lug or shoulder 22 is formed integral with the rocker 19 and a similar shoulder 22' is provided on the rocker 19', these shoulders being spaced apart and having a compression spring 23 interposed between their inner faces. A bolt 24 loosely disposed in the shoulders 22 and 22' and passing through the spring 23, together with suitable washers not shown, retains the spring against lateral displacement and limits the outward movement of the rockers.

The rocker 19 has an integral stub shaft 25 (see dotted lines in Fig. 4) extending radially from the hub and substantially at right angles to the shoulder 22. A pivot block 26 is journaled on this stub shaft 25. Block 26 has short pins 27 extending from opposite sides. The pivot block 26 is held against axial movement on the stub shaft 25 by a screw 28 (Fig. 3) threaded into the end of the shaft 25. The spindle 11 carries a similar pivot block 29 adjacent the fixed collar 12. Connecting the pivot block 29 on the spindle 11 and the pivot block 26 on the rocker 19 is a link 30 having forked ends which are disposed on the pins of the pivot blocks and may oscillate with respect thereto as shown in Figs. 3, 4 and 5. The rocker 19' is coupled to the spindle 11' by similar means comprising pivot block 26', link 30' and pivot block 29'.

The action of each pair of wheel-carrying assemblies will now be explained with particular reference to Figs. 3, 4 and 5. When the wheels A and B are resting on, or traversing a smooth and level road surface, the wheel spindles will be held in the relative position illustrated in Fig. 4, since the spring 23 is made sufficiently strong to support that portion of the vehicle load borne by the corresponding end of the walking beam I. However, when one of the wheels, for example, the wheel A, encounters a bump on the road surface, it will be raised to a greater elevation than the wheel B. In such case the spindle arm 14 will be lifted in a vertical arc about the hinge pin 17, the link 30 will be thrust upwardly, and the rocker 19 will be rotated counter-clockwise as viewed in Figs. 4 and 5.

Ordinarily, this movement of rocker 19 will cause similar movement to be imparted to rocker 19' through the intermediary of the spring 23, thus causing a downward thrust on link 30' corresponding to the upward thrust on link 30, and resulting in the raising of the end of the walking beam I one-half the distance that wheel A is lifted. But if the raising of wheel A occurs suddenly the inertia of the load will cause the compression of the spring 23, and, if the load is heavy enough and wheel A is not raised too high, the shock will be taken up entirely by the compression spring 23, and the wheels, wheel-carrying assemblies, and beam I will be in the relative positions shown in Fig. 5. Thus the upward thrust of the wheel A is cushioned after the manner of a shock-absorber. Were both wheels to strike a sudden bump in the road, the spring 23 would be compressed while both wheels were lifted simultaneously.

The plane of rotation of the wheel A is not changed by the upward thrust of the uneven road surface as in conventional devices, but is confined by the spindle-arm 14 to the normal plane of rotation, that is, parallel to the beam I and at a constant distance therefrom. No tilting of either wheel nor consequent sidewise slipping of the tires occurs.

Fig. 1 illustrates how my compensating mechanism operates to effect greater stabilizing of the load. Here the wheels are shown raised at different elevations such as would occur when the vehicle is traversing an unusually rough road. Thus wheel H is shown as raised a considerable distance above wheel G or wheel A. The rear end of the walking beam I will be lifted a maximum distance of only one-half of the difference in elevation of the wheels G and H, and, since the beam I acts as a lever fulcrumed on the spindles of the forward pair of wheels, the beam I is raised at its middle only one-quarter of the difference in elevation of said wheels G and H by the raising of wheel H. Furthermore, any compression of the corresponding spring 23 becomes effective to reduce the proportionate amount of movement of the end of the bolster L and superimposed load.

The stop plates 18 (see Fig. 6) definitely establish the extent of upward travel of the spindle-arms 14 and 14', and thus the downward movement of the beam I with respect to the supporting wheels. In the event of fracture or complete failure of one of the wheels or its spindle, the end of the walking beam I can drop only until the stop plate 18 abuts the spindle-arm of the other wheel of the pair. The other wheel then carries a double load, but there is no danger of the vehicle changing its course or leaving the road under such condition. The stops 18 may be so arranged that the distance that the beam is permitted to drop under such conditions will be less than the effective depth of the pneumatic tires on the wheels of the vehicle, so that in case of complete loss of air in one tire the action previously described takes place and the load on that wheel is shifted to the companion wheel and the defective tire does not have the rim of the wheel resting on it. Fig. 3 illustrates the end of the beam I supported by one wheel, the other wheel having been removed from its spindle.

Figure 8:
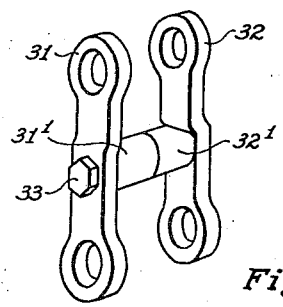
Fig. 8 is a perspective view of a modified form of one of the parts of the spindle assembly.

In Figs. 3, 4, 5 and 6 I have shown the links 30 and 30' as each comprising a single piece. Fig. 8 illustrates a modified form of link made in two parts 31 and 32, having central inwardly extending bosses or spacers 31' and 32', the two parts being coupled together by a bolt 33 or other suitable means. Actually, I have found it more practical to use links constructed in this manner than the links shown in Figs. 3, 4, 5 and 6. However, various other ways in which such links might be constructed in order to function in the manner intended will suggest themselves.

Figure 2:
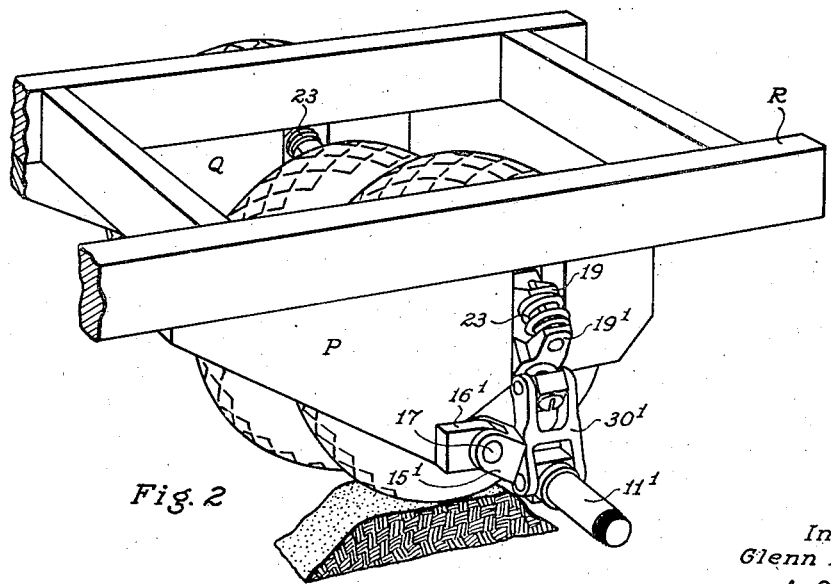
Fig. 2 is a perspective view of the rear portion of a vehicle chassis supported on four wheels and also embodying the principles of my invention, one of these wheels having been removed to reveal the spindle-carrying mechanism and two of the remaining wheels raised to different heights as in Fig. 1.

In the vehicle shown in part in Fig. 2 there are no longitudinal walking beams. The longitudinal members P and Q are in this instance made rigid with the vehicle chassis R, and the hinge fixture 16' is firmly secured at the bottom of each longitudinal member, as before. A fixed shaft (not shown but similar to the shaft 20 of Figs. 3 and 6) carries the rockers 19 and 19' of each pair of wheel-carrying assemblies, such shaft being firmly secured in each of the members P and Q. In all other respects the wheel-carrying assemblies are the same.

Figure 9:
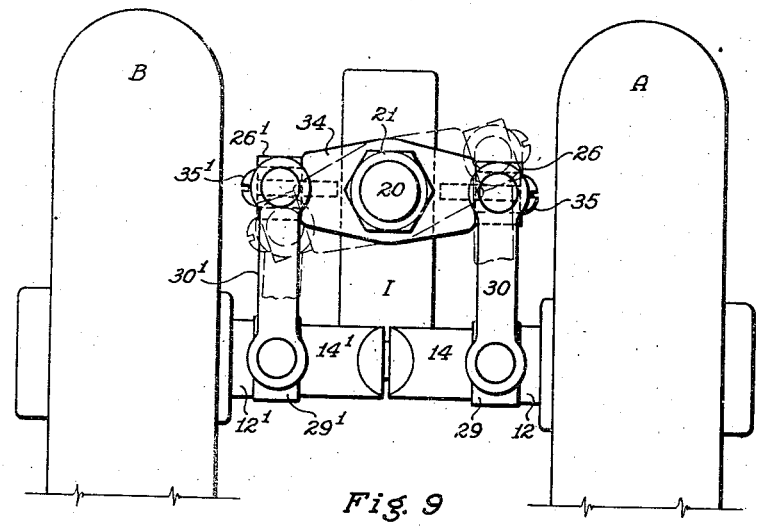
Fig. 9 is an end elevation similar to Fig. 4 but showing a modified means for connecting a pair of spindle assemblies.

Fig. 9 shows a modified form in which my wheel-carrying assembly may be made. In this modification each of the links 30 and 30' is connected to an end of a single rocker 34 which is rotatably mounted at its middle on the fixed shaft 20. The rocker 34 has an integral stub shaft (shown dotted) at each end and on these shafts are mounted the pivot blocks 26 and 26' which are held in place by screws 35 and 35', respectively. Otherwise the spindle-carrying means are the same as previously described. This construction is suitable when it is desired to dispense with springs or shock cushioning devices, or when other spring supporting means are provided in connection with the mounting of the vehicle frame.

Figure 10:
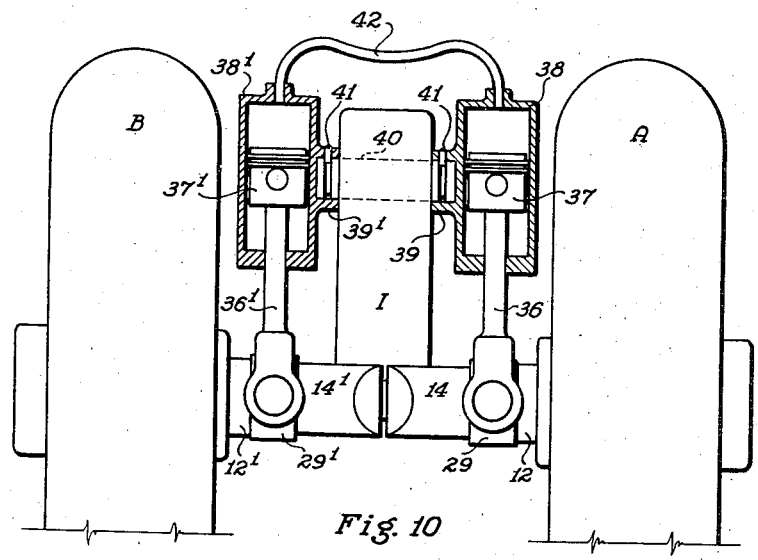
Fig. 10 illustrates another modified means for connecting these spindle assemblies.

Fig. 10 illustrates a further modified form in which my invention may be made. In this modified construction, in place of the links 30 and 30', I provide upstanding rods 36 and 36' bifurcated at their lower ends and pivotally mounted to the pivot blocks 29 and 29', respectively. Pivotally disposed on the upper ends of these rods 36 and 36' are hydraulic pistons 37 and 37' which are adapted to reciprocate in hydraulic cylinders 38 and 38'. In order to compensate for the arcuate movement of the ends of the spindle arms 14 and 14' each of the cylinders 38 and 38' is formed with a hollow boss 39 and 39' bored to receive the ends of a shaft 40 extending transversely through the beam I. Pins 41 firmly secured in the bosses 39 and 39' coact with grooves in the shaft 40 to hold the cylinders in place and permit slight arcuate movement in parallel vertical planes. The space above the pistons 37 and 37' is filled with a suitable liquid such as oil and a flexible tube 42 places the two cylinders in communication so that as one of the pistons 37 or 37' is forced upwardly by the vertical movement of the respective wheel, the fluid in that particular cylinder is forced to pass thru the tube 42 into the other cylinder where it exerts downward force on the piston disposed therein.

Other modified means may be used for connecting the two wheel-carrying assemblies in each pair without departing from the principles of my invention. It is essential, however, that each wheel-carrying assembly or spindle-carrying means be separately hinged to a longitudinal beam or supporting vehicle frame member or its equivalent, that each of such assemblies or means be permitted up and down movement but held against lateral movement, and that the up and down movement be confined within certain limits.

I claim:

1. A mounting for a pair of vehicle wheels including a longitudinal member, a spindle-carrying means for each wheel spindle, said spindles extending in opposite directions from said longitudinal member and substantially perpendicular to the plane of said longitudinal member, each of said spindle-carrying means hinged to said longitudinal member for up and down movement, said hinges being perpendicular to the plane of said longitudinal member, whereby said spindles may be moved up or down with respect to said longitudinal member, but will always be substantially perpendicular to said longitudinal member and the wheels on said spindles will always be spaced a constant distance from the plane of said longitudinal member, means definitely limiting the upward movement of each spindle-carrying means, compensating linkage connecting said spindle-carrying means, said linkage pivotally connected to said longitudinal member, whereby upward movement of one spindle-carrying means will cause a force to be exerted in the opposite direction on the other spindle-carrying means.

2. In a vehicle, a compensating device for mounting a pair of wheels, said device including a walking beam, a pair of wheel-carrying assemblies, a wheel spindle in each of said assemblies, said spindles extending in opposite directions from said walking beam and substantially perpendicular to the plane of said walking beam, each of said assemblies hinged to said walking beam for up and down movement, said hinges being perpendicular to the plane of said walking beam, whereby said spindles may be moved up or down with respect to said walking beam but will always be substantially perpendicular to said walking beam and the wheels on said spindles will always be spaced a constant distance from the plane of said walking beam, means definitely limiting the upward movement of each assembly, compensating linkage connecting said assemblies, said linkage pivotally connected to said walking beam, whereby upward movement of one assembly will cause a force to be exerted in the opposite direction on the other assembly.

3. In a vehicle, a pair of parallel longitudinal members, a pair of wheel-carrying assemblies separately hinged at the end of each said parallel longitudinal members, a horizontal wheel spindle in each wheel-carrying assembly, the spindles in each pair of assemblies extending in opposite directions, said assemblies hinged to the parallel longitudinal members to permit up and down movement in parallel planes of the wheels on said spindles, compensating means connecting each pair of said assemblies, said compensating means including a rocker arm pivotally mounted on the longitudinal member, and links connecting the ends of said rocker arm with each wheel-carrying assembly, respectively.

4. In a vehicle, a longitudinal member, a pair of wheel-carrying assemblies hinged to said longitudinal member, each assembly including a wheel spindle, the spindles in said pair of assemblies extending in opposite directions and normally in horizontal alignment with each other, said assemblies hinged to said longitudinal member for up and down movement in parallel planes, the hinges of said assemblies being in alignment transversely of said longitudinal member, linkage connecting said assemblies so constructed and arranged that upward movement of one assembly will cause a force to be exerted in the opposite direction on the other assembly.

5. In a vehicle, a longitudinal member, a pair of wheel-carrying assemblies hinged at one end of said longitudinal member, each assembly including a wheel spindle, the spindles in said pair of assemblies extending in opposite directions and normally in horizontal alignment with each other, said assemblies hinged to said longitudinal member for up and down movement in parallel planes, the hinges of said assemblies being in alignment transversely of said longitudinal member, linkage connecting said assemblies so constructed and arranged that upward movement of one assembly will cause a force to be exerted in the opposite direction on the other assembly.

6. In a vehicle, a walking beam, a pair of wheel-carrying assemblies hinged to each end of said walking beam, each assembly including a wheel spindle, the spindles in each pair of assemblies extending in opposite directions and normally in horizontal alignment with each other, said assemblies hinged to said walking beam for up and down movement in parallel planes, the hinges of each pair of said assemblies being in alignment transversely of said walking beam, compensating means connecting the assemblies in each pair so constructed and arranged that upward movement of one assembly will cause a force to be exerted in the opposite direction on the other assembly.

7. In a vehicle, a walking beam, a pair of wheel-carrying assemblies hinged to each end of said walking beam, each assembly including a wheel spindle, the spindles in each pair of assemblies extending in opposite directions and normally in horizontal alignment with each other, said assemblies hinged to said walking beam for up and down movement in parallel planes, the hinges of each pair of said assemblies being in alignment transversely of said walking beam, compensating means connecting the assemblies in each pair so constructed and arranged that upward movement of one assembly will cause a force to be exerted in the opposite direction on the other assembly, said compensating means including linkage pivotally supported on said walking beam.

8. In a vehicle, a longitudinal member, a pair of wheel-carrying assemblies, a horizontal wheel-spindle in each assembly, said wheel-spindles extending in opposite directions, said assemblies hinged to said member for up and down movement in planes spaced constantly the same distance from said member, compensating means connecting said assemblies, said compensating means including a rocker pivotally mounted on said member.

GLENN L. LARISON.